Dec. 14, 1971  B. A. MOORE  3,626,601
PEANUT DRYERS AND ATTACHMENTS FOR PEANUT DRYERS
Filed May 8, 1970

INVENTOR
BURTON A. MOORE

BY Larson, Taylor and Hinds
ATTORNEYS

United States Patent Office 3,626,601
Patented Dec. 14, 1971

3,626,601
PEANUT DRYERS AND ATTACHMENTS FOR PEANUT DRYERS
Burton A. Moore, Rte. 1, Emporia, Va. 23847
Filed May 8, 1970, Ser. No. 35,819
Int. Cl. E26b 19/00
U.S. Cl. 34—90                                6 Claims

ABSTRACT OF THE DISCLOSURE

In peanut dryers of the type comprising a bin-like container having an air-pervious floor through which air may be forced upwardly to dry peanuts located in the container, the drying action is facilitated and expedited by one or more air distributors mounted on the previous floor inside the container. Each distributor is an open-bottomed structure extending from the floor upwardly, and is air-pervious at least in its upper sections, so as to receive air through its open bottom and discharge this air at multiple points within the mass of peanuts. Each distributor is of metal construction, with substantial areas of the upper portions being fabricated of open metal mesh, and preferably is detachably mounted on the air-pervious floor. The distributors are readily mountable on existing dryers, or can be supplied as integral parts of new dryers. Each distributor preferably is a box-like structure of horizontally elongate form, with its height being substantially greater than its width. Each distributor preferably is of a length approximately 2 feet less than the corresponding internal dimension of the bin-like container.

FIELD OF THE INVENTION

This invention relates generally to crop dryers, particularly peanut dryers, and more particularly to apparatus for effecting a better distribution of drying air throughout the mass of peanuts to be dried, so as substantially to reduce the required drying time. Although not exclusively, it is intended primarily as an improvement feature for known peanut dryers of the wagon or vehicular type wherein air is passed upwardly from a plenum through a perforated floor into and through a mass of freshly harvested peanuts.

BACKGROUND AND SUMMARY OF THE INVENTION

The present practice among many, if not all, peanut growers is to harvest peanuts in the field, and load them immediately after digging onto trucks to be carried to market. The trucks are driven to a drying station, which may be a commercial station, where the wet peanuts are loaded into a wagon or trailer or bin having a false floor, the false floor being formed with perforations, or fabricated from a metal mesh material, or otherwise being freely pervious to air. Usually an air plenum chamber is located below the false floor, and this plenum chamber is adapted for connection to a source of drying air. The wagon or trailer or the like is then moved to a source of warm dry air, and connected thereto in a known manner. The warm air moves upwardly through the false floor, through the peanuts, and is expelled from the open top of the wagon or bin, perhaps five feet above the false floor. Assuming a full load, the air will have passed through a mass of peanuts five feet deep. While drying times can vary substantially, often the peanuts will be dried for 24–48 hours in this manner. Once the peanuts are dried, they are then dumped or otherwise removed from the drying wagon or bin, and reloaded in a truck to be transported to a place of storage or processing.

Dryers of the general type mentioned in the preceding paragraphs are well known, and are commercially available. Exemplary of such dryers and related apparatus are U.S. Pat. No. 3,417,487 (Harris) issued Dec. 24, 1968, U.S. Pat. No. 3,378,065 (Mitchell et al.) issued Apr. 16, 1968; U.S. Pat. No. 3,359,650 (Mitchell et al.) issued Dec. 26, 1967; and U.S. Pat. No. 3,279,094 (Blanton) issued Oct. 18, 1966.

While dryers of the general type have been and are used widely, they are not without their problems. Perhaps basic among these problems is the fact that air flow through the peanuts is not at all uniform, and some parts of a load will receive much more air than other parts, and some parts of a load will receive much warmer air than other parts. This often results in the bottom of the load becoming extremely hot or dry, or even roasted, before the top of the load has been reduced to the desired state of dryness. The problem is a serious one, and it has received the attention of persons working in this art. Thus, two of the above-mentioned patents are directed particularly to proposed solutions for this problem. The Blanton patent proposes a series of baffle member in the plenum chamber, with openings of appropriate sizes to control the pressure within different compartments defined partially by the baffles, toward passing substantially equal amounts of drying gas through all portions of a mass of peanuts. The Harris patent proposes a substantially closed drying container, with a series of transverse perforated tubes extending from one side of the wagon to the other at points disposed within the mass of peanuts. These perforated tubes serve as air exhaust outlets from the container, and the flow of air is from the top of the container to the tubes, or from the bottom of the container to the tubes. The tubes are provided with dampers, such that the flow to a particular tube may be reduced or increased. For various reasons, I consider neither of these solutions to be entirely satisfactory. Thus, the Harirs solution appears to be expensive, not readily adaptable to existing dryers, and does not pass warm air directly to the inner portions of the peanut mass. The same general observations seem applicable to the solution of the Blanton patent.

My solution to the basic problem described above involves a distributor which is attached as an extension in present drying bins or wagons, and which may be placed in new drying bins or wagons or containers in the future without any substantial redesign. The function of my distributor is to distribute or circulate the drying air within the peanuts, thus providing for more uniform drying, and reducing the drying time by the order of 40%, and thus substantially reducing the cost of drying. It would also facilitate the drying of larger loads of peanuts. My distributor not only increases the uniformity of distribution or circulation through the load, but also passes the warm air directly to the inner portions of the mass of peanuts, as opposed to other arrangements wherein the warmest air is passed initially only to the outer portions of the peanut mass.

It is an object of this invention to provide improved peanut drying apparatus, and to provide distributor attachments for readily improving existing drying apparatus. Other and further objects, advantages and features of my invention will be obvious to those skilled in the art from the ensuing description of a preferred embodiment, taken in conjunction with the accompanying drawing.

DETAILED DESCRIPTION OF THE PREFERRED EMBODIMENT

Figure 1:
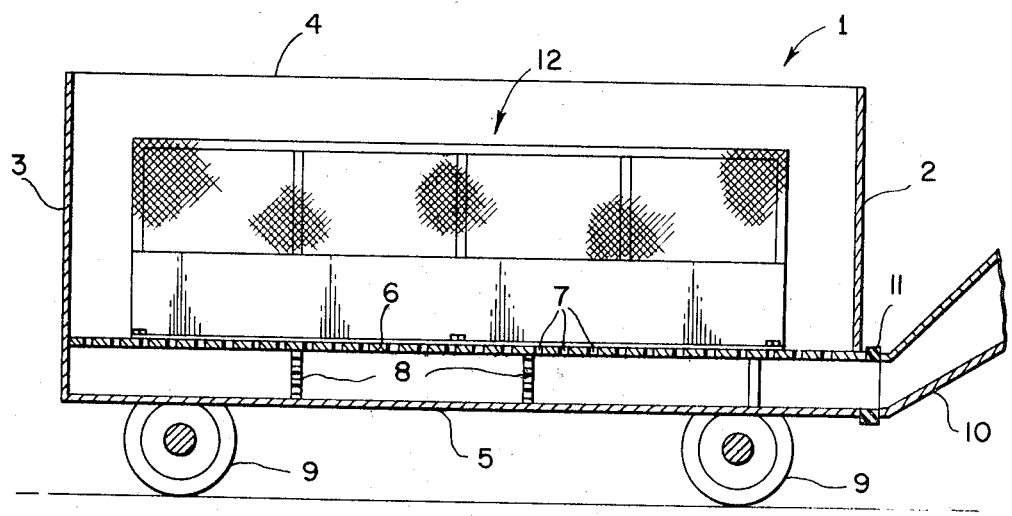
FIG. 1 is a schematic section of an exemplary known drying wagon illustrating the general manner of incorporation of my improved distributor or circulator.

Referring now to the drawings, a drying chamber or container is shown generally at 1. The drying container is of a known type, and usually is rectangular as viewed in plan. It has vertical end walls 2 and 3, and vertical side walls, one of which is shown at 4. A false bottom or perforated bottom 6 is formed with perforations or the like 7. A second bottom wall 5 defines, with floor 6, a plenum chamber, in which baffles 8 are mounted. The baffles are perforated so that air may pass therethrough and throughout the plenum chamber. The container is in the form of a wagon, and is mounted on wheels 9 for free movement. Drying gas, usually warm or hot air, is supplied to the plenum chamber from a suitable supply conduit 10. Supply conduit 10 may be detachably coupled to the container through a sealing arrangement indicated schematically at 11. This drying chamber or container is of a known type, and is intended to be exemplary only. The particular structure or arrangement of the drying container is immaterial to my invention.

Indicated generally at 12 in FIG. 1 is a distributor or circulator in accordance with my invention. Only one such distributor is shown in FIG. 1, extending fore-and-aft of the trailer container, but it will be understood that usually several such distributors will be mounted in the container in a parallel side-by-side relationship. Also, the distributors may be oriented longitudinally as shown, or laterally. Where the trailer is of the dumping type, the distributors preferably are aligned longitudinally with the direction of dumping movement of the peanuts.

Figure 2:
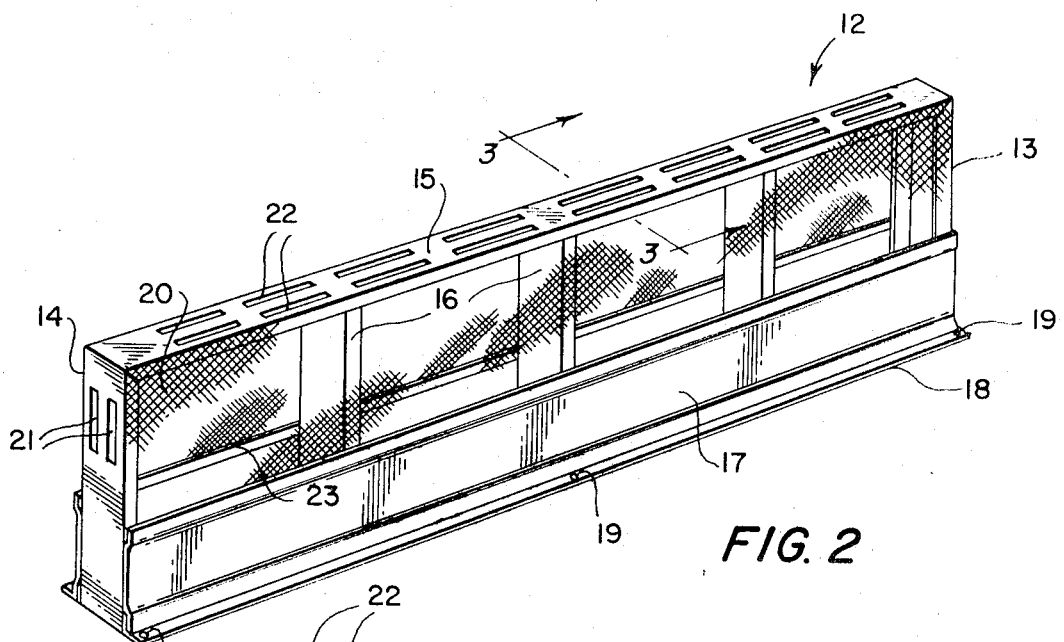
FIG. 2 is a perspective view of a preferred embodiment of my improved distributor or circulator.
Figure 3:
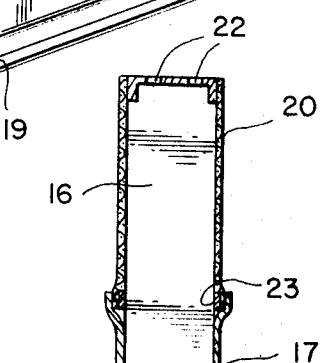
FIG. 3 is a section view taken along lines 3—3 of FIG. 2.

As shown in more detail in FIGS. 2 and 3, each distributor preferably is of metal construction, and includes end walls 13 and 14, top wall 15, and identical side walls, the side walls each having a lower section 17 of metal sheet and an upper section 20 of open metal mesh. Vertical members 16 are spaced along the interior of the distributor 12 to function as support members and as divider members, whereby the interior of the distributor 12 is divided into several vertical air passages. Metal straps 23 may be welded to dividers 16 and end walls 13 and 14 so as to facilitate attachment and support of the metal mesh 20 and the sheet metal 17 at their line of meeting. An angle member 18 is provided along the base of each side wall, and includes bolt holes 19 for use in bolting the distributor 12 rigidly to the perforated floor 6 of the drying chamber. As shown in FIG. 3, the box-like distributor has an open bottom 24 through which air may pass freely upwardly from the perforations 7 in the perforated floor 6. Slotted openings 21 are provided in the upper portions of end walls 13 and 14, and corresponding slotted openings 22 are provided in top wall 15.

The particular manner or manners of construction or fabrication of the distributor 12 is not critical to the invention. However, in a preferred embodiment, the end walls 13 and 14, top wall 15, and dividing and supporting members 16 may be formed of steel channel stock. Base angles 18 may be of standard steel angle stock, and the lower side wall 17 may be of metal sheet stock. Assembly and fabrication preferably is by welding, although bolted connections may obviously be used. In one version that has been constructed, the distributor 12 is 13 feet long, 3½ feet high, and 6 inches wide. The height of the upper edge of side sheets 17 above the floor is approximately 1½ feet. These sheets 17 may be of 18-gauge galvanized sheet material. The stock channel for the members 13, 14, 15 and 16 may be 6 x 2 x ¼. Base angles 18 may be of 2 x 2 x ¼ stock material. Metal mesh 20 may be any standard open metal mesh, preferably with a maximum opening of one-half inch. Slots 21 and 22 should be not more than one-half inch wide. The metal mesh may be spot welded or brazed directly to the legs of channels 13, 14, 15 and 16, and to the metal straps 23, which may be of 2-inch by ¼-inch material. Angles 18 may be welded directly to channels 13, 14 and 16, and overlapped by sheet 17, or they may be welded to sheet 17. Sheets 17 are welded to channels 13, 14 and 16, and may be welded to straps 23. If desired, exterior cover straps may be placed over the metal mesh and sheets 17 along each channel 13, 14 and 16, and welded thereto.

It will, of course, be obvious that the various slots 21 and 22 could be replaced by larger openings covered by metal mesh.

In practice, I prefer to construct the distributor of a length two feet less than the corresponding dimension of the drying container or bin, that is, two feet less than the distance between the walls of the bin between which the distributors will extend. In placing plural distributors of a bin, I prefer to have them side-by-side, generally parallel, spaced approximately 36 inches apart, and with the outermost distributors spaced approximately 18 inches from the bin walls. The height of the distributors preferably will be such that their tops will lie approximately 18 inches below the top of the peanut mass. While the frame work of the entire distributor could be covered by metal mesh, I prefer the illustrated arrangement utilizing generally impervious walls over the lower areas of the distributor, so as to ensure the passage of warm air directly to the inner portions of the peanut mass.

From the foregoing, it will be readily apparent that the distributors may be easily and detachably mounted in existing drying containers, and, particularly for the wagon type containers, can be easily removed to permit use of the wagon for other purposes. In the manufacture of new drying bins or the like, I prefer also that the distributors be incorporated in a detachable manner. Of course, they should always be mounted so as to leave uncovered a substantial percentage of the perforated floor, so that the warm air will pass upwardly through the floor directly to the bottom layers of peanuts, as well as through the distributors and into the middle and upper layers.

Having thus described a perferred embodiment of my invention in the manner required by the patent statutes, I claim:

1. Peanut drying apparatus comprising a bin-like container defined by upright walls and and a floor; said floor being perforated so as to be pervious to air; means defining an air plenum chamber beneath said perforated floor, said plenum chamber including means adapted for communication with a source of pressurized air, whereby air can be forced into said plenum and upwardly through said perforated floor to dry peanuts located in the bin-like container; and air distributing means mounted on said perforated floor inside said bin for receiving air from perforations in the perforated floor and discharging it inside said bin-like container at points spaced above said perforated floor but below the tops of said walls, said air distributing means comprising at least one elongate air distributor detachably mounted on said perforated floor and extending upwardly therefrom, said distributor being substantially completely open at its bottom and including air discharge openings at points located above said perforated floor, said distributor being defined by two relatively elongate generally rectangular side walls and two relatively narrow generally rectangular end walls extending upwardly from said open bottom, and a relatively elongate generally rectangular top wall, said side walls being formed of generally imperforate sheet material in their lower sections and of open metal mesh in their upper sections, and said distributor including upright divider members along its length for strengthening the distributor and dividing the interior thereof into a plurality of vertical air flow paths leading upwardly from said open bottom.

2. Peanut drying apparatus as claimed in claim 1 wherein said end walls are generally imperforate in their lower sections and perforated in their upper sections, and said top wall is perforated, whereby air entering said open bottom through said perforated floor must travel upwardly inside said distributor before it can pass out of said distributor.

3. Peanut drying apparatus as claimed in claim 1 wherein said end walls, said top wall and said dividers comprise steel channel members, and said metal mesh is connected to the channel sides.

4. Peanut drying apparatus as claimed in claim 3 further comprising steel angle members connected to the upright channel members at their lower ends whereby said angle members define at least part of said open bottom, one leg of each angle member being horizontally disposed, and bolt holes being formed in said horizontally disposed legs through which bolts pass to connect the distributor to said perforated floor.

5. Peanut drying apparatus as claimed in claim 1 wherein said air distributing means comprises a plurality of said elongate air distributors, said distributors being generally parallel to each other and to two first opposed walls of said bin-like container and generally normal to two other opposed walls of said bin-like container, the ends of each distributor being spaced approximately one foot from said other opposed walls, said distributors being spaced approximately three feet from each other, with the outermost distributors spaced approximately eighteen inches from said two first opposed walls of said bin-like container, the top wall of said distributor being disposed at least three and one-half feet above said perforated floor at least one and one-half feet below the top of said upright wall of said bin-like container.

6. Peanut drying apparatus as claimed in claim 1 wherein said bin-like container is mounted on wheels so as to be freely mobile.

References Cited
UNITED STATES PATENTS

| | | | |
|---|---|---|---|
| 2,532,530 | 12/1950 | Anderson et al. | 34—233 |
| 1,542,721 | 6/1925 | Piening et al. | 98—55 |
| 2,722,058 | 11/1955 | Heal | 34—232 |
| 3,327,909 | 10/1966 | Burton | 34—233 |
| 3,359,650 | 12/1967 | Mitchell et al. | 34—214 |
| 3,378,065 | 4/1968 | Mitchell et al. | 165—122 |
| 3,417,487 | 12/1968 | Harris | 34—233 |
| 2,683,940 | 7/1954 | Pixler | 34—232 |

FREDERICK L. MATTESON, JR., Primary Examiner

H. B. RAMEY, Assistant Examiner

U.S. Cl. X.R.

34—232; 98—55